United States Patent [19]

Tominaga

[11] Patent Number: 5,394,903
[45] Date of Patent: Mar. 7, 1995

[54] HYDRAULIC CONTROL VALVE

[75] Inventor: Hiroyoshi Tominaga, Kawasaki, Japan

[73] Assignee: Komatsu Zenoah Kabushiki Kaisha, Tokyo, Japan

[21] Appl. No.: 167,442

[22] PCT Filed: Jan. 29, 1991

[86] PCT No.: PCT/JP91/00097
§ 371 Date: Oct. 22, 1991
§ 102(e) Date: Oct. 22, 1991

[87] PCT Pub. No.: WO91/14121
PCT Pub. Date: Sep. 19, 1991

Related U.S. Application Data

[63] Continuation of Ser. No. 7,372, Jan. 21, 1993, abandoned, which is a continuation of Ser. No. 775,959, Oct. 22, 1991, abandoned.

[30] Foreign Application Priority Data

| Mar. 5, 1990 | [JP] | Japan | 2-51715 |
| Mar. 5, 1990 | [JP] | Japan | 2-51716 |
| Mar. 16, 1990 | [JP] | Japan | 2-64039 |

[51] Int. Cl.⁶ ............................................. F15B 13/04
[52] U.S. Cl. ......................... 137/596.13; 91/436; 91/451; 137/596.2
[58] Field of Search .................. 91/436, 451, 530; 137/596.13, 596.2

[56] References Cited

U.S. PATENT DOCUMENTS

| 3,012,576 | 12/1961 | Williams | 137/596.13 |
| 3,414,017 | 12/1968 | Hodgson | 137/596.2 |
| 3,717,175 | 2/1973 | Boydell | 137/596.13 |
| 3,730,220 | 5/1973 | Boydell | 137/596.2 |
| 3,771,558 | 11/1973 | Ailshie | 137/625.69 X |
| 4,080,994 | 3/1978 | Flaschar et al. | 137/596.13 |
| 4,099,541 | 7/1978 | Binkley et al. | 137/596.13 |
| 4,139,021 | 2/1979 | Ailshie et al. | 137/596.13 |
| 4,215,720 | 8/1980 | Becker | 137/596.13 X |
| 4,253,482 | 3/1981 | Stephens | 137/596.13 X |
| 4,430,927 | 2/1984 | Turnbull | 137/596.13 X |
| 4,655,250 | 4/1987 | Jackson | 137/596.13 |
| 5,022,434 | 6/1991 | Tsukimoto | 137/596.2 |

FOREIGN PATENT DOCUMENTS

| 56-139064 | 10/1981 | Japan . |
| 1-169183 | 7/1989 | Japan . |
| 1-54588 | 11/1989 | Japan . |

*Primary Examiner*—Gerald A. Michalsky
*Attorney, Agent, or Firm*—Flynn, Thiel, Boutell & Tanis

[57] ABSTRACT

The present invention relates to a hydraulic control valve in a construction machine, wherein a parallel port (20b) and bridge ports (20c) which are provided in a valve body (40) of the hydraulic control valve are formed by machining, cylinder drain ports (20e) are limited to through holes opened on opposite sides of the valve body (40) and caused to join together in a tank port block (39). Accordingly, when the valve body (40) is manufactured by casting, only a main core (19) forming a spool port (13h) need be used, so that the control valve can be made compact in size. Furthermore, portions (20', 21') where a passage of a neutral port of the core has heretofore been formed by jointing the main core (19) to joint cores (20, 21) are formed by machining a manual operation process of jointing can be dispensed with and the working efficiency and casting accuracy are improved. Further a safety valve (43) and a suction valve (44) are formed separately from each other, and these valves are provided separately on the valve body (40), so that the valve body has a simplified construction and is made compact in size.

1 Claim, 15 Drawing Sheets

HYDRAULIC CONTROL VALVE

This application is a continuation of U.S. Ser. No. 08/007,372, filed Jan. 21, 1993, now abandoned, which is a continuation of U.S. Ser. No. 07/775,959, filed Oct. 22, 1991, now abandoned.

BACKGROUND OF THE INVENTION

1. Field of the Invention

The present invention relates to a hydraulic control valve adapted for use in a construction machine such as a power shovel.

2. Description of Prior Art

A conventional power shovel comprises, as illustrated in FIG. 9, a lower self-propelled movable body 1 driven by a propelling motor, not shown, an upper turntable 2 capable of being turned by a turning motor, not shown, and a working machine 3 mounted at the front portion of the turntable 2.

The working machine 3 has a boom 6 which can be swung rightward and leftward by a swinging cylinder 4 and movable vertically at the tip end thereof by a boom cylinder 5 and an arm 8 pivotally mounted at the tip end of the boom 6 which is turned by an arm cylinder 7.

The arm 8 has a tip end to which a bucket 10 is attached so as to be turned by a bucket cylinder 9. A blade 12 which is vertically movable by a blade cylinder 11 is mounted at the front portion of the movable body 1.

A hydraulic control valve 13 provided at each actuator controls the propelling motor, the turning motor and hydraulic actuators composed of various cylinders. Each hydraulic control valve 13 is, as illustrated in FIG. 10, normally connected with one another.

Each hydraulic control valve 13 comprises, as illustrated in FIG. 11, a valve body 13a, a spool 14 housed in the valve body 13a for switching oil passages in the valve body 13a, the spool 14 normally being retained at a neutral position by a return spring 13b wherein an oil under pressure supplied to a pump port 13c is drained through a drain port 13d into a tank 16 by way of a port block 15.

The valve body 13a of the hydraulic control valve 13 is, as illustrated in FIG. 12, conventionally formed integrally by casting. However, in the conventional hydraulic control valve 13, a main core for forming a spool port 13h is complex so that narrow passages can not be formed in the hydraulic control valve 13 since a cylinder drain port 13e, a bridge port 13g and the spool port 13h are separately formed in three stages. As a result, this was an obstacle to making the hydraulic control valve compact in size since the diameter of the spool port 13h could not be less than that ranging from 11 mm to 12 mm.

The present invention has been made in view of the problem set forth above and is to provide a hydraulic control valve so that a valve body can be manufactured without using cores having complex structures.

Particularly, the conventional control valve body is, as described above, integrally formed by casting and a passage of a neutral port in a valve chamber is also formed by casting wherein cores are employed for forming the passage of the neutral port at the time of casting. The core is formed, as illustrated in FIG. 13, by casting a main core 19 for forming the spool port 13h and thereafter by jointing joint cores 20 and 21 to the main core 19. There was a problem in that a mold can not be split along the line X—X when forming the core if the jointing cores 20 and 21 are integrated with each other, which involves the following drawbacks.

(1) A jointing operation of the cores is manually made which results in preventing an automatic assembly of the cores, hence this is inefficient.

(2) Jointing deviation between the cores is liable to occur which involves a deteriorated casting accuracy.

(3) Casting flash is liable to occur at the jointing portions of the cores.

(4) Jointing agent causes generating gas at the time of casting which is likely to generate a casting porosity.

Accordingly, it is a second object of the present invention to provide a hydraulic control valve capable of manufacturing a valve body by machining the passage without using the conventional jointing cores, whereas the passage was conventionally formed by the jointing cores.

The valve body 13a of the conventional control valve 13 forms therein, as illustrated in FIG. 14, a parallel port 13f, the bridge ports 13g, cylinder ports 13i and the cylinder drain port 13e wherein a load check valve 17 for allowing the oil under pressure only to flow from the parallel port 13f into the bridge port 13g is provided between the parallel port 13f and the bridge port 13g and a hydraulic cylinder 18 is connected to the cylinder ports 13i therebetween.

If the spool 14 of the control valve 13 having the arrangement set forth above is moved rightward, the oil under pressure introduced into the pump port 13c reaches the parallel port 13f and pushes the load check valve 17, then flows into the bridge ports 13g. The oil under pressure is further introduced into a bottom side of a hydraulic cylinder 18 from cylinder ports 13i which communicates with the spool 14 by the movement of the spool 14 so as to stretch the hydraulic cylinder 18 whereas the oil under pressure at the side of the cylinder rod flows from the cylinder ports 13i to the cylinder drain port 13e and thereafter drained into a tank 16.

During the operations set forth above, if a shock is applied to the hydraulic cylinder 18 or a tensile force acts on the hydraulic cylinder 18 for some reasons, an anomalous pressure or a negative pressure is generated in the hydraulic circuit which causes the hydraulic cylinder 18 to be damaged or unstable. As a result, this is likely to cause an obstruction for working.

To prevent such a problem, a suction salty valve 120 is conventionally provided, as illustrated in FIG. 15, between the cylinder ports 13i and the cylinder drain port 13e for preventing the anomalous pressure or the negative pressure from being generated.

That is, when the anomalous pressure is generated in the cylinder ports 13i, a poppet 121 provided inside the suction safty valve 120 is released so that the pressure inside the cylinder ports 13i is relieved into the cylinder drain port 13e to prevent the anomalous pressure from being generated in the hydraulic circuit.

When the negative pressure is generated in the cylinder port 13i, a suction valve 122 is released by the negative pressure so that the oil under pressure in the tank 16 is introduced into the cylinder port 13i from the cylinder drain port 13e whereby the negative pressure is prevented from being generated in the hydraulic circuit.

Inasmuch as the conventional hydraulic control valve 13 has the suction safety valve 120 serving as the safty valve function and the suction valve function combined in a single valve so that the structure of the valve is complex which impedes the miniaturization thereof.

SUMMARY OF THE INVENTION

To achieve the above object, a hydraulic control valve according to the present invention capable of controlling various actuators provided in a construction machine comprises a parallel port and bridge ports respectively provided in a valve body of the hydraulic control valve and formed by machining, and cylinder drain ports formed by a single through hole opened to both sides of the valve body and merging into a drain passage inside a tank port block attached to a side surface of the valve body.

With such an arrangement, it is possible to form the spool port by a single main core when the valve body is manufactured by casting which enables the valve body to employ a single-stage core. As a result, it is possible to form a narrow passage in the valve body.

According to the present invention, the core for forming the passage of a neutral port of cores in a valve chamber is formed merely by the main core for forming a spool port and the passage portion which was conventionally formed by jointing cores which jointed to the main core can be formed by machining, thereby eliminating the jointing cores. Accordingly, a manual working step for jointing the jointing cores to the main core can be eliminated which improves the working efficiency and the casting accuracy by preventing the casting flash and porosity from occuring.

Furthermore, the valve body of the hydraulic control valve according to the present invention can relieve the anomalous pressure generated in the hydraulic circuit into the tank and has the safty valve for sucking the oil under pressure from the tank when the negative pressure is generated, that is, the safty valve for relieving the anomalous pressure and the suction valve for preventing the negative pressure are separately provided on the valve body and disposed apart on the valve body so that the structure of the valve body can be compact and minituarized. As a result, the hydraulic control valve can be minituarized as a whole.

DESCRIPTION OF PREFERRED EMBODIMENTS

Embodiments of the present invention will be described with reference to drawings.

Figure 1:
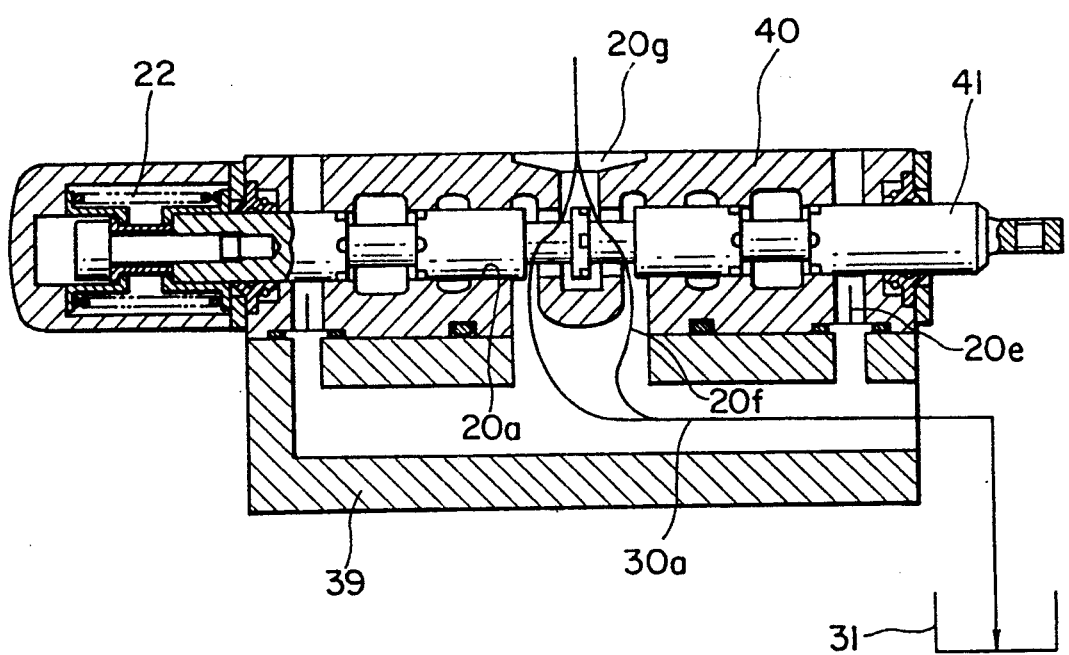
FIG. 1 is a lateral cross sectional view of a hydraulic control valve according to an embodiment of the present invention.
Figure 2:
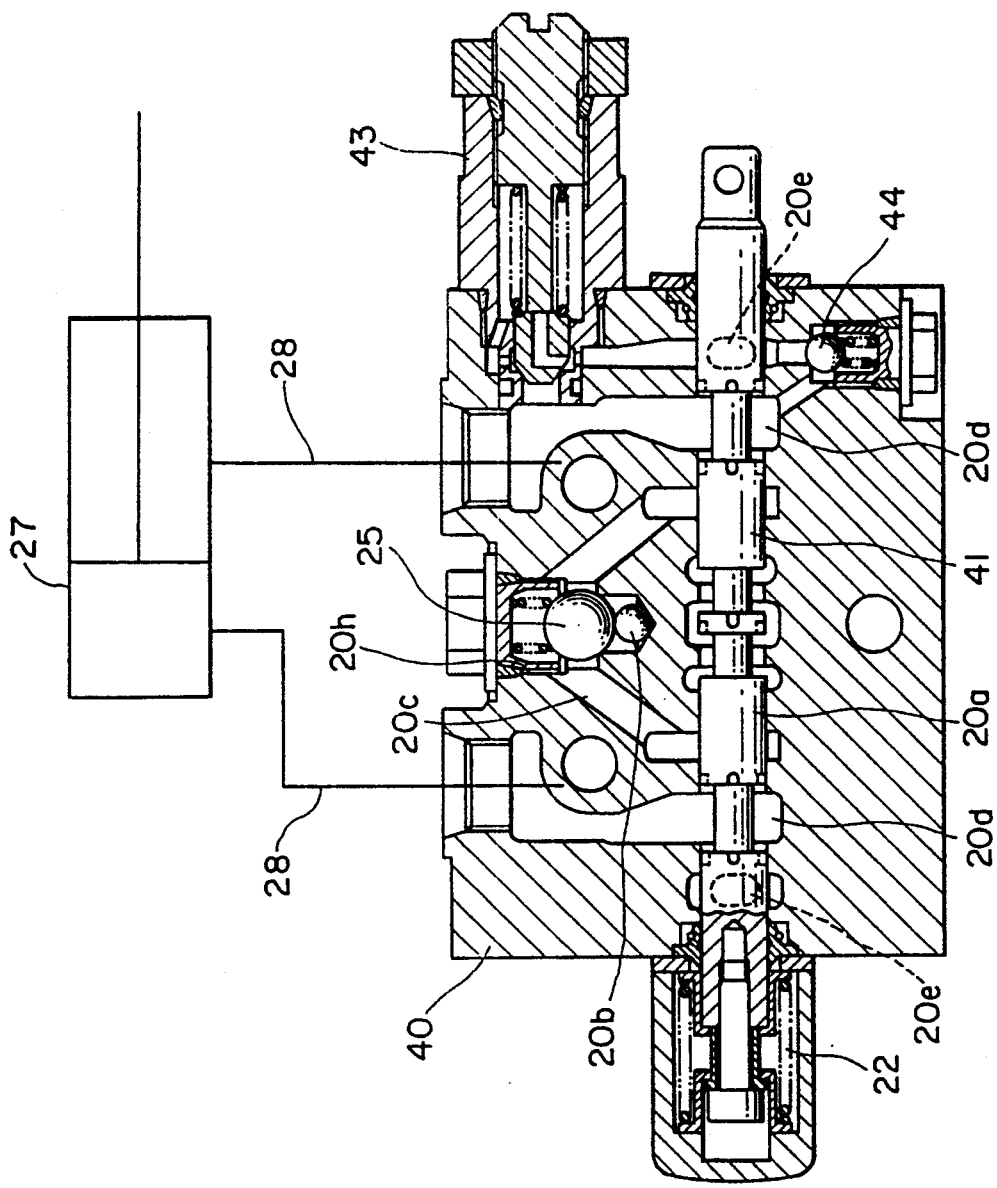
FIG. 2 is a vertical cross sectional view of the hydraulic control valve in FIG. 1, FIGS. 3 and 4 are view showing operations of the hydraulic control valve in FIG. 1, FIGS. 5(a) and 5(b) are views showing hydraulic control valves according to another embodiment of the present invention wherein a main core forming a spool port and the shape of casting are respectively explained illustratively which are cross sectional views taken along V—V in FIG. 12, FIGS. 6 to 8 are a lateral cross sectional view, a longitudinal cross sectional view and an enlarged view showing a portion close to a safty valve and a suction valve according to still another embodiment of the present invention.

Referring to FIGS. 1 and 2, designated at 40 is a valve body, 41 is a spool slidably housed in a spool port 20a of the valve body 40, 22 is a return spring for retaining the spool 41 at a neutral position, 43 is a safty valve, 44 is a suction valve and 25 is a load check valve.

The valve body 40 has a parallel port 20b and bridge ports 20c which are respectively formed by machining by way of a hole 20h to which a load check valve 25 is attached. The load check valve 25 is attached between the parallel port 20b and the bridge ports 20c for allowing oil under pressure to flow from the parallel port 20b into the bridge ports 20c. Cylinder ports 20d are formed at both sides of the bridge ports 20c and connected to a bottom side of a hydraulic cylinder 27 and a rod side of the hydraulic cylinder 27 by way of lines 28. Cylinder drain ports 20e are provided as through holes at both sides of the cylinder ports 20d so as to penetrate both side surfaces of the valve body 40.

A drain passage 30a in a tank port block 39 attached to the side surface of the valve body 40 is connected to the cylinder drain ports 20e.

The drain passage 30a in the tank port block 39 is also connected to drain ports 20e of the valve body 40 so that the oil under pressure discharged from a pump port 20g to the drain ports 20e is drained into a tank 31 through the drain passage 30a when the spool is retained at the neutral position.

Figure 3:
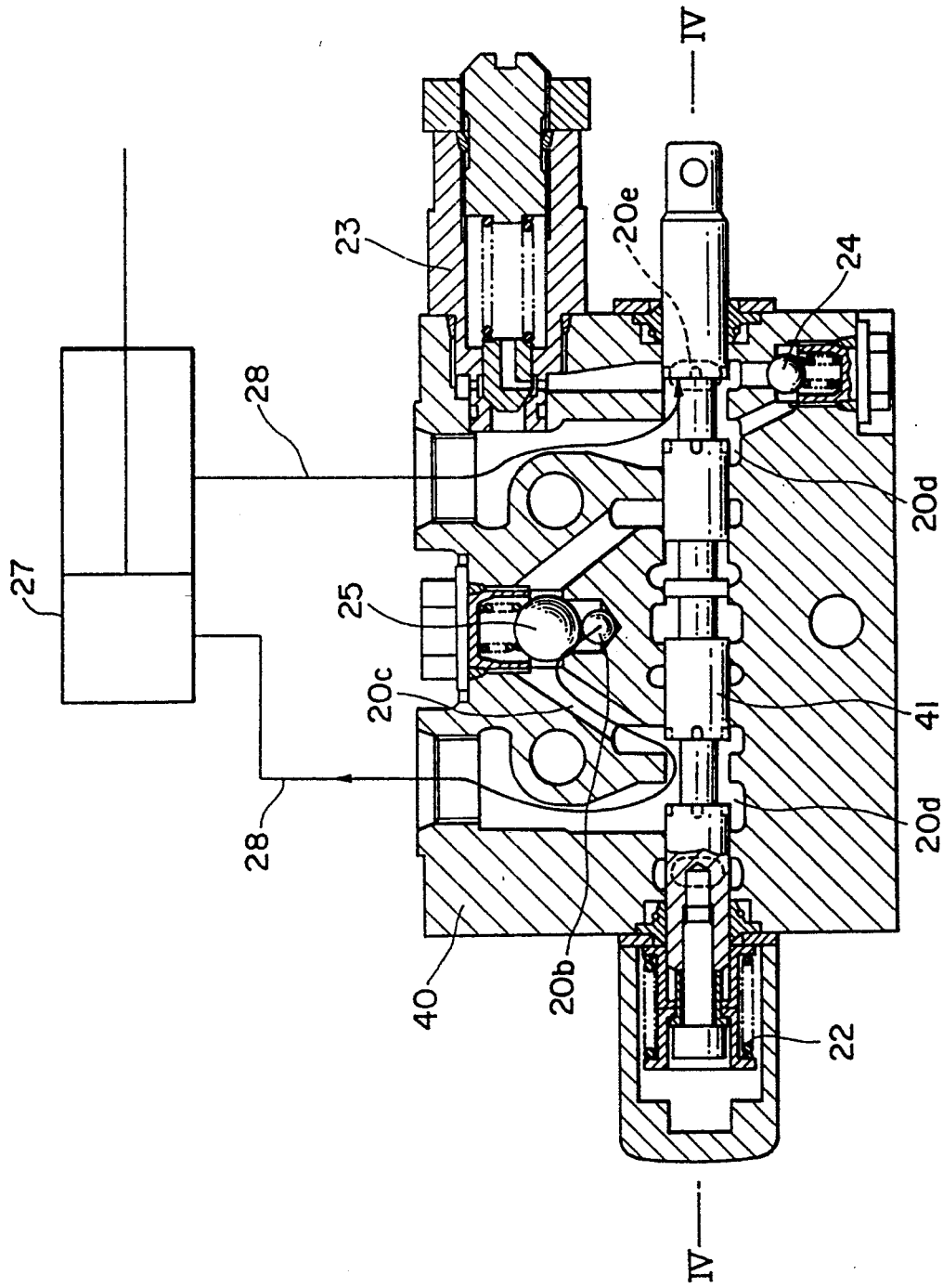

Operations of the hydraulic control valve will be described hereinafter. If the spool 41 is moved e.g. rightward in order to control the hydraulic cylinder 27 provided in the construction machine and the like, the oil under pressure introduced into the pump port 20g flows into the parallel port 20b to push the load check valve 25 so that the parallel port 20b communicates with the bridge ports 20c and the oil under pressure flows into the bridge ports 20c as illustrated in FIG. 3.

The oil under pressure thus flown into the bridge ports 20c flows into the cylinder ports 20d which communicate with the bridge ports 20c by the movement of the spool 41 and further flows into the bottom side of the hydraulic cylinder 27 so as to extend a rod of the hydraulic cylinder 27.

Figure 4:
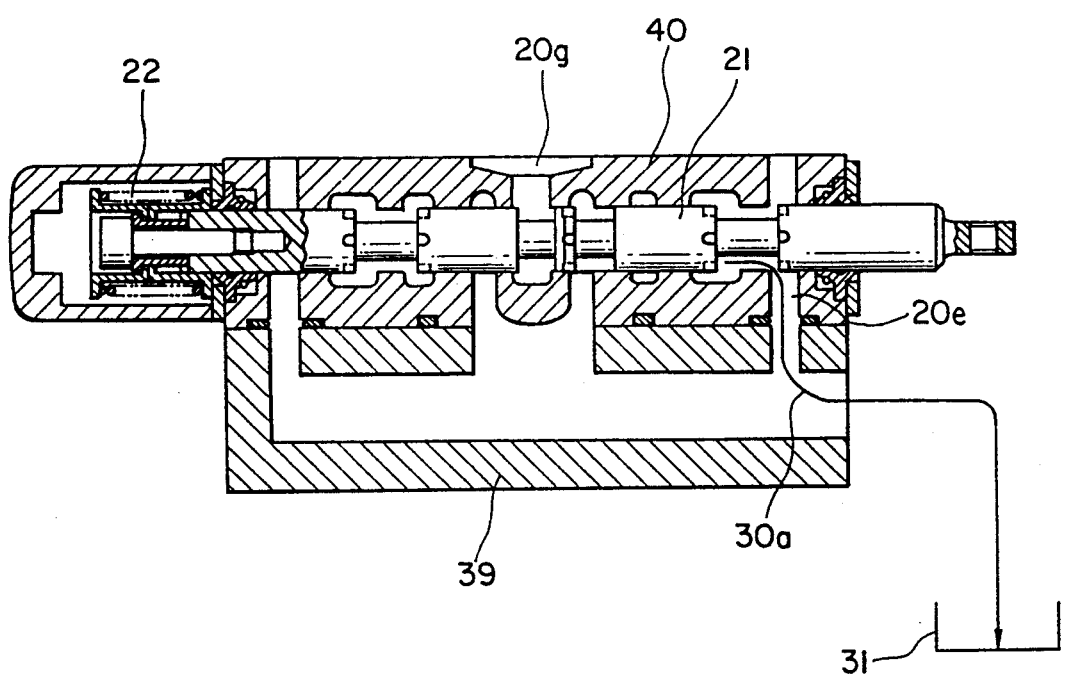

The oil under pressure at the rod side of the hydraulic cylinder 27 is introduced into the cylinder drain ports 20e communicating with the cylinder ports 20d by the movement of the spool 41 and further flows into the drain passage 30a of the tank port block 39 as illustrated in FIG. 4 (a cross sectional view taken along IV—IV in FIG. 3), and is finally drained into the tank 31.

When the spool 41 is moved leftward, the operation of the hydraulic control valve is same as that mentioned just above excepting that the rod of the hydraulic cylinder 27 is moved inside the cylinder. Accordingly, the explanation of the operation in this case is omitted.

Inasmuch as the parallel port 20b and the bridge ports 20c inside the valve body 40 are respectively formed by machining and jointing portions of the right and left cylinder drain ports 20e are provided outside the valve body so that the port formed inside the valve body at the time of casting employs only the main core for forming the spool port, which facilitates the manufacturing of the valve body.

Figure 12:
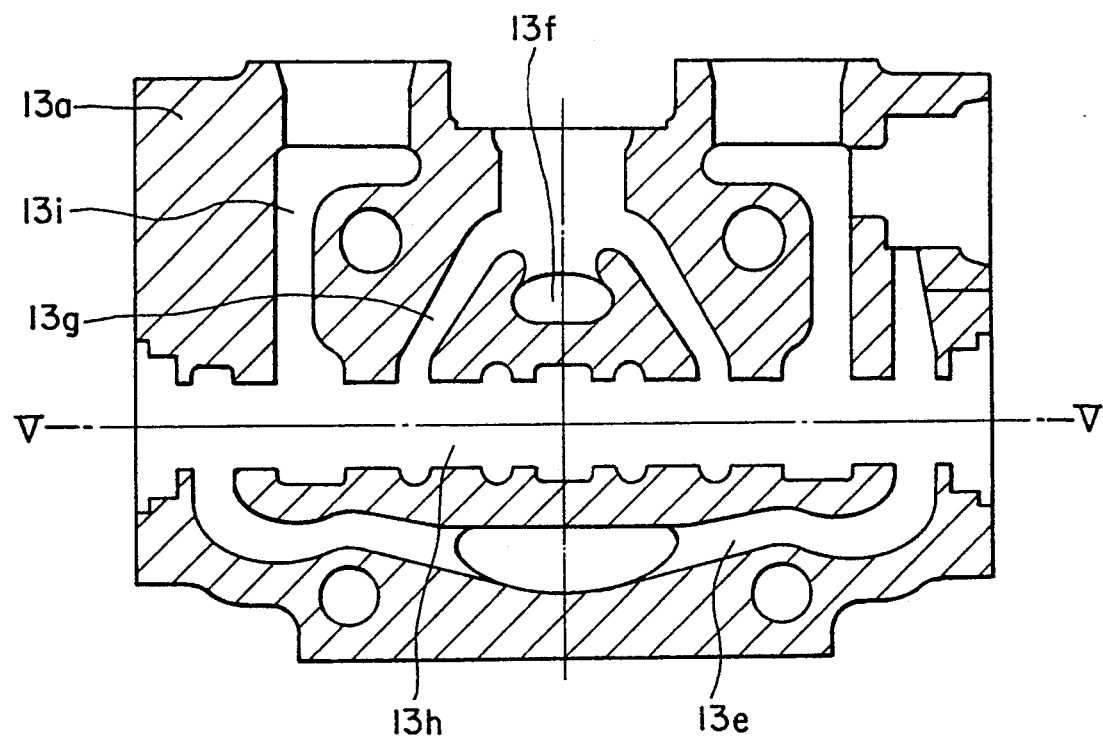
FIG. 12 is a cross sectional view of a valve body.
Figure 13:
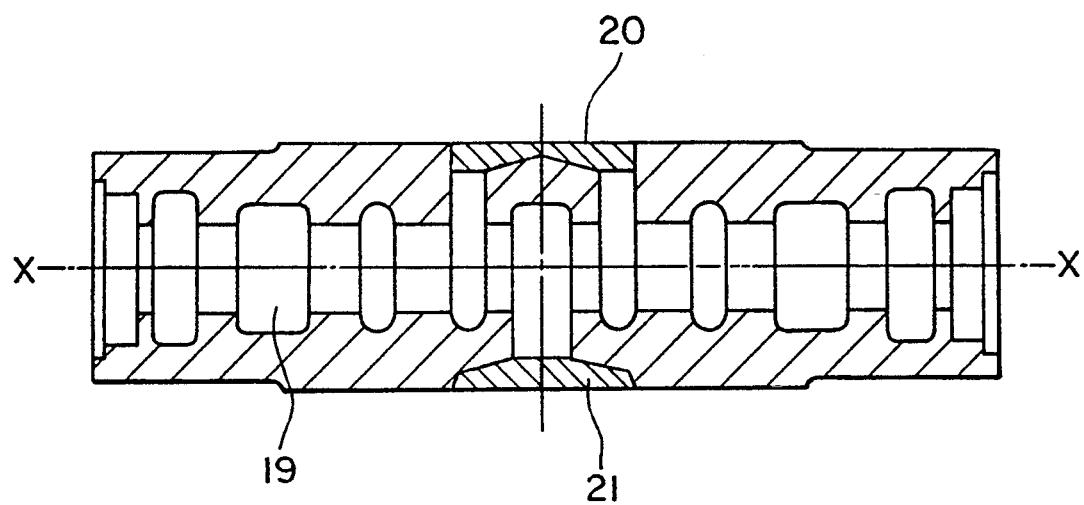
FIG. 13 is a cross sectional view explaining a main core for forming a spool port of the valve body of the conventional hydraulic control valve.
Figure 14:
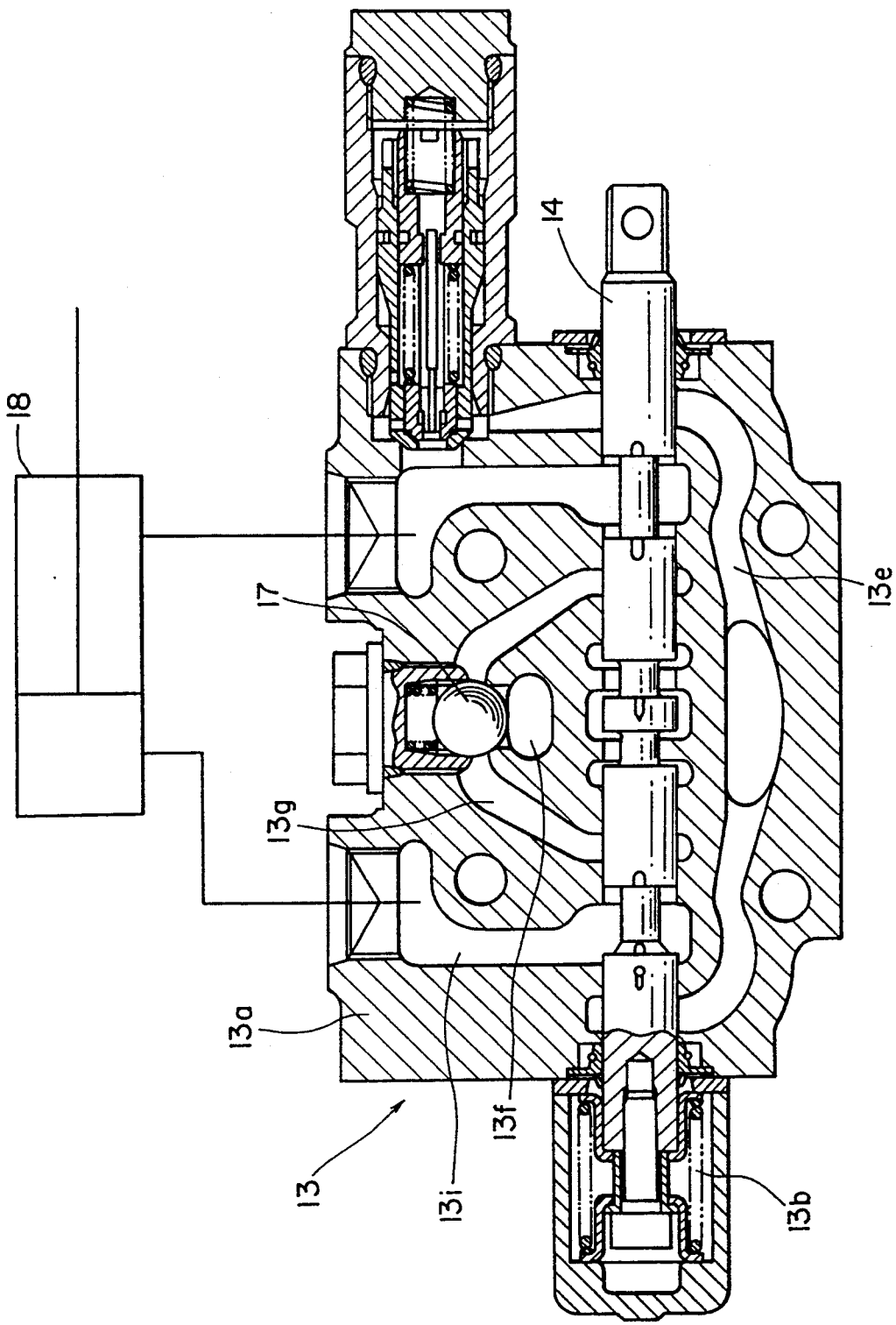
FIG. 14 is an enlarged vertical cross sectional view of the conventional hydraulic control valve and FIG. 15 is an enlarged view of a suction safty valve of the conventional hydraulic control valve.
Figure 15:
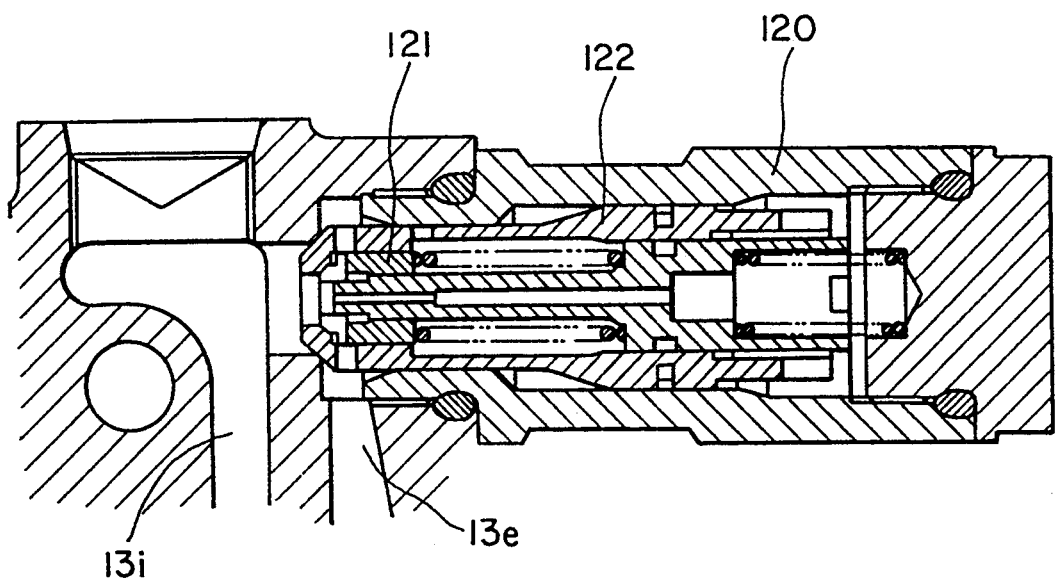

As illustrated in FIG. 12, the passage of the neutral port in the valve chamber is formed by casting and the core is used for forming this passage at the time of casting wherein the spool port 13h is formed by the main core 19.

The embodiment of the present invention is characterized in that the passage portion of the neutral port, which was conventionally formed by jointing the joint cores 20 and 21 to the main core 19, can be formed by machining.

Figure 5A:
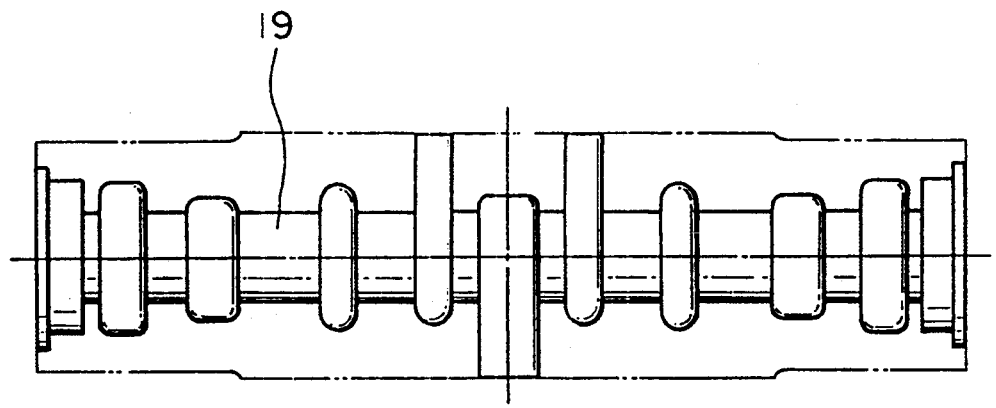
Figure 5B:
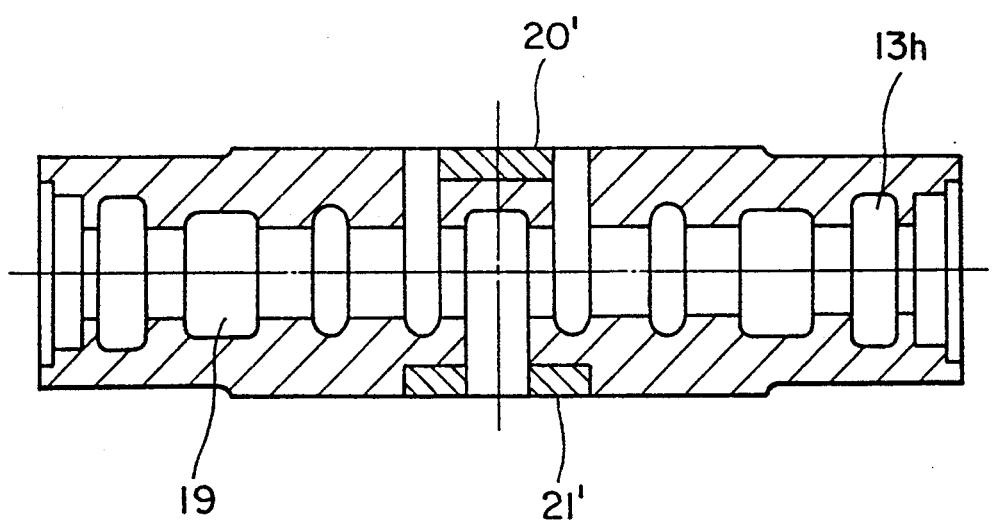

That is, the portions as denoted 20' and 21' in FIG. 5(b) are passage portions conventionally formed by the cores but they can be formed by machining according to the present invention. As a result, the joint cores can be eliminated and the formation of the core can be composed of only the main core 19 as illustrated in FIG. 5(a) which solves the various drawbacks accompanied by the adoption of the conventional joint cores and improves the casting accuracy.

Figure 6:
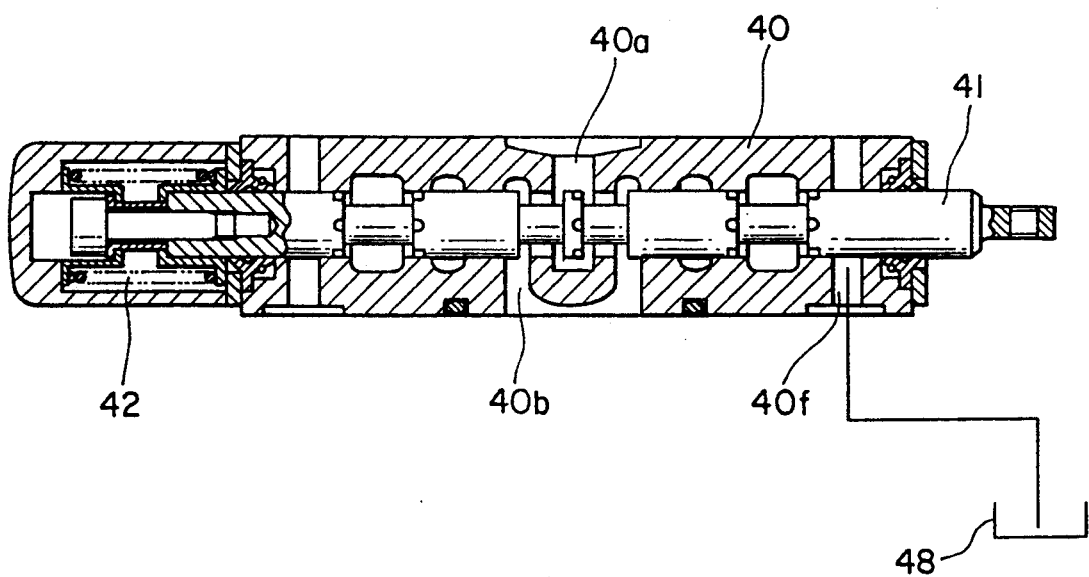
Figure 7:
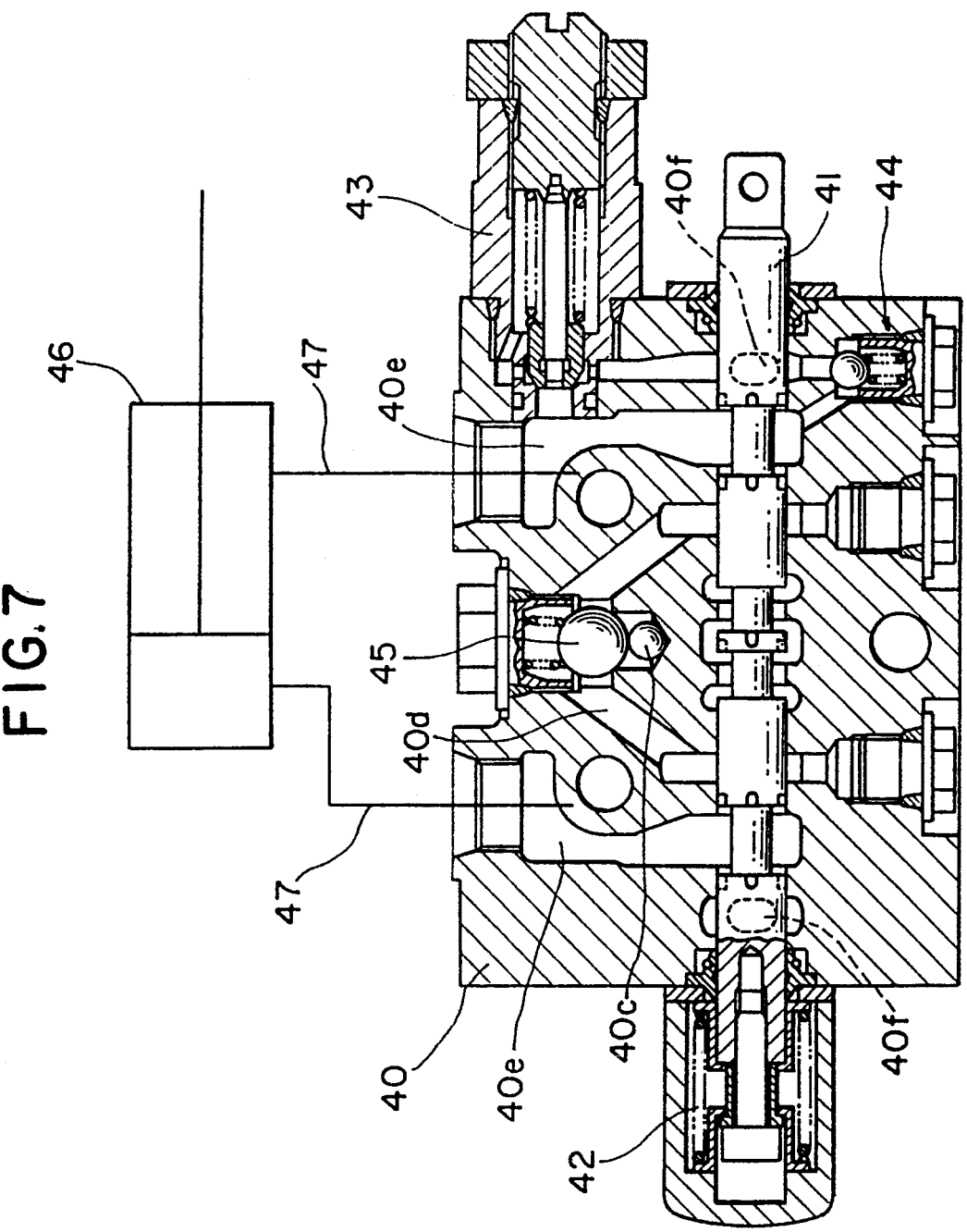
Figure 8:
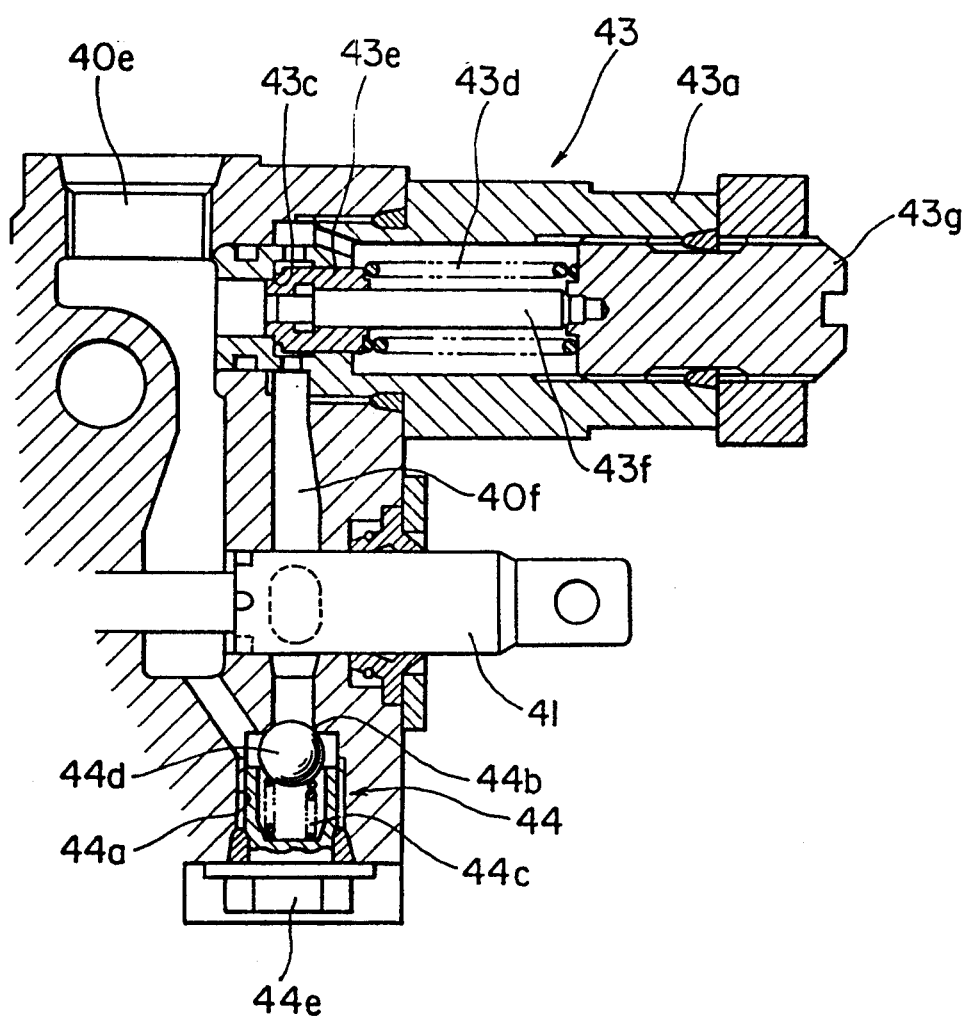
Figure 9:
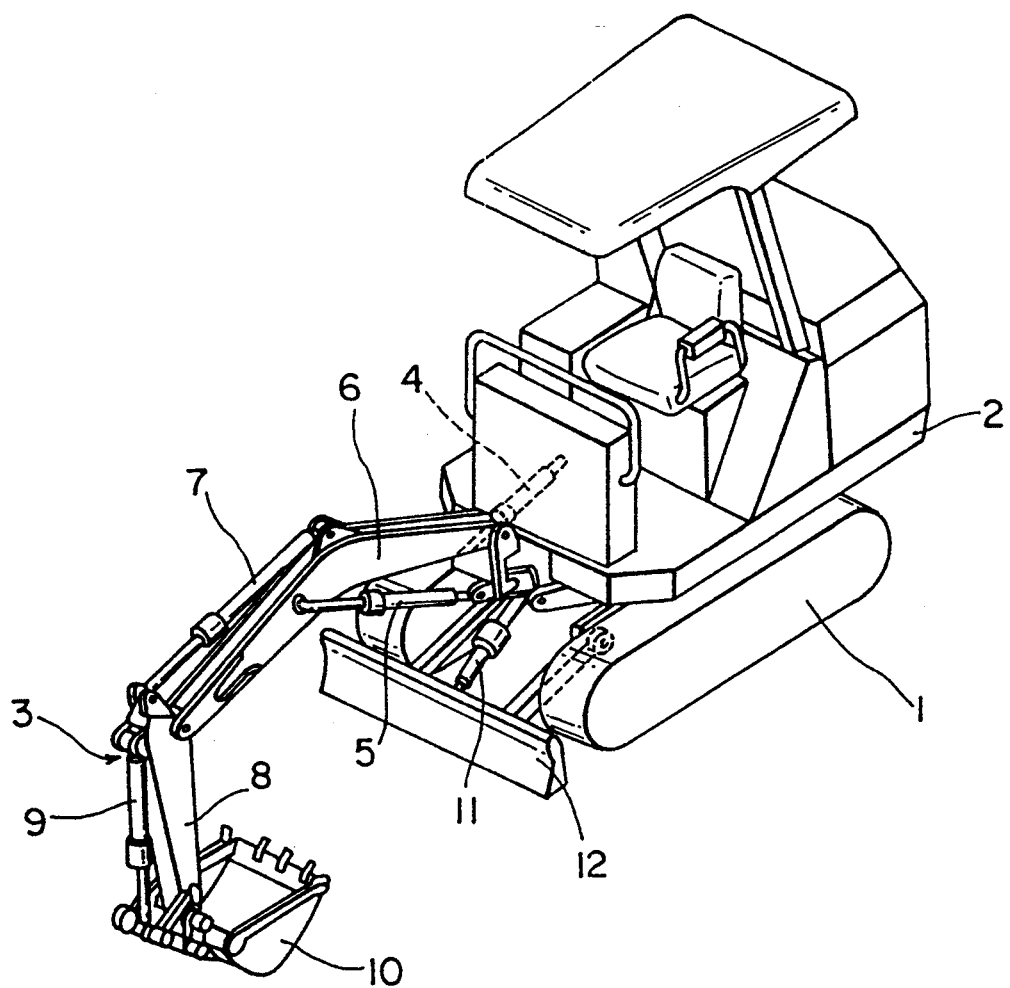
FIG. 9 is a perspective view of a construction machine which is an object to be controlled by the hydraulic control valve.
Figure 10:
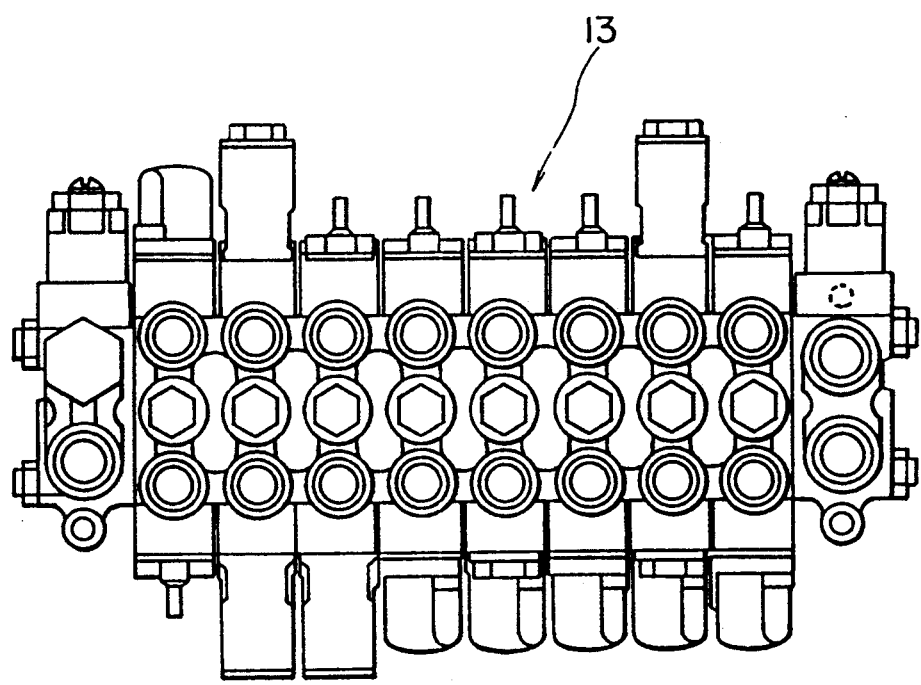
FIG. 10 is a plan view of a conventional hydraulic control valve.
Figure 11:
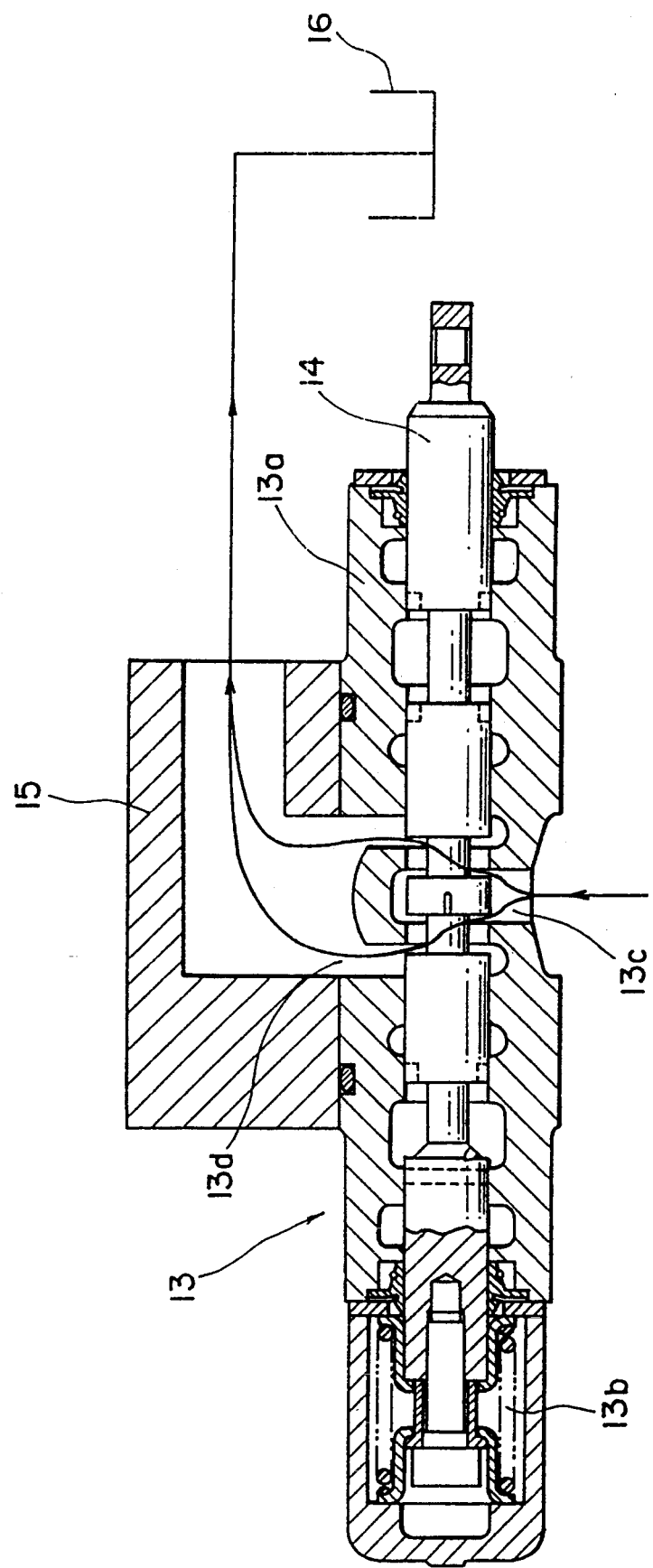
FIG. 11 is a lateral cross sectional view of FIG. 10.

FIGS. 6 to 8 show still another embodiment of the present invention.

In FIGS. 6 and 7, designated at 40 is a valve body, 41 is a spool movably provided in the valve body 40, 42 is a return spring for retaining the spool 41 at the neutral position, 43 is a safty valve, 44 is a suction valve and 45 is a load check valve.

The valve body has therein a pump port 40a, a drain port 40b, a parallel port 40c, bridge ports 40d, cylinder ports 40e and cylinder drain ports 40f wherein a load check valve 45 is provided between the parallel port 40c and the bridge ports 40d for allowing the oil under pressure merely to flow from the parallel port 40c into the sides of the bridge ports 40d and the cylinder ports 40e connected to the bottom side and the rod side of a hydraulic cylinder 46 provided in the working machine by way of lines 47.

A safety valve 43 and a suction valve 44 are respectively provided separately between the cylinder ports 40e and the cylinder drain ports 40f.

The safety valve 43, as illustrated in FIG. 8, has one end which is screwed into an end surface of the valve body 40 and a valve seat 43c is provided midway on a passage communicating the cylinder port 40e and the cylinder drain port 40f. A poppet 43e, which is biased by a poppet spring 43d, is pressed against the valve seat 43c.

One end of a piston 43f penetrates a central portion of the poppet 43e and another end of the piston 43f is fixedly mounted at an adjusting screw 43g screwed into another end of the case 43a. The suction valve 44 provided separately from the safety valve 43 blocks, as illustrated in FIG. 8, a valve hole 44a bored in the valve body 40 which communicates with the cylinder ports 40e and the cylinder drain ports 40f and a valve seat 44b defined at the opening of the cylinder drain ports 40f.

A ball-shaped suction valve 44d is pressed against the valve seat 44b by a suction spring 44c while a plug 44e housing the suction spring 44c therein is screwed into the lower opening of the valve hole 44a.

An operation of the hydraulic control valve according to this embodiment will be described hereinafter. When the spool 41 inside the valve body 40 is moved rightward so as to control the hydraulic cylinder 46 provided in the working machine, the oil under pressure introduced into the pump port 40a flows into the parallel port 40c and pushes the load check valve 45 so as to communicate the parallel port 40c with the bridge ports 40d into which the oil under pressure flows. The oil under pressure flows into the bottom side of the hydraulic cylinder 46 communicating with the cylinder ports 40e by the movement of the spool 41, thereby extending the rod of the hydraulic cylinder 46.

The oil under pressure at the rod side of the hydraulic cylinder 46 flows into the cylinder drain ports 40f communicating with the cylinder ports 40e by the movement of the spool 41 and thereafter drained into a tank 48.

When the oil under pressure inside the cylinder ports 40e becomes anomalously high by applying a shock to the hydraulic cylinder 46, the poppet 43e provided on the safety valve 43 pushes against the poppet spring 43d so that the anomalous oil under pressure is drained into the tank 48 by way of the cylinder drain ports 40f. As a result, the hydraulic cylinder 46 and the like are prevented from being damaged due to the anomalous oil under pressure.

When the negative pressure is generated in the cylinder ports 40e when the hydraulic cylinder 46 is stretched due to some causes, the oil under pressure at the side of the cylinder drain ports 40f becomes higher than that of the cylinder ports 40e whereby the suction valve 44d is released because of the difference between the oil under pressure at the side of the cylinder drain ports 40f and that of the cylinder ports 40e. As a result, the oil under pressure in the tank 48 flows into the cylinder drain ports 40f so that the negative pressure at the side of the cylinder ports 40e can be prevented.

As mentioned above, the hydraulic control valve according to this embodiment can be manufactured with ease and structured compact in size compared with the conventional hydraulic control valve which has the safety valve integrated with the suction valve. It is possible to make the valve body compact in size by separating the safety valve from the suction valve and incorporating them into the valve body.

INDUSTRIAL UTILIZATION

As mentioned in detail above, according to the present invention, the parallel port and the bridge ports in the valve body are formed by machining and the jointing portions of the right and left cylinder drain ports are provided outside the valve body so that the ports formed in the valve body at the time of casting comprises only the spool port which can be formed by the main core.

With the arrangement set forth above, since the valve body can be casted with use of the single-stage core, a narrow spool port can be formed in the control valve, so that the spool having a diameter less than 10 mm can be manufactured with ease which facilitates the miniaturization thereof and reduction of weight thereof.

Since the passage portion conventionally formed by the joint core jointed to the main core for forming the spool port can be formed by machining, it is possible to dispense with the joint cores so that the core is formed by only the main core. As a result, it is possible to automatically form the core assembly whereby the working efficiency can be improved conspicuously and the jointing deviation of the core and the casting flash at the jointing portion and the casting porosity due to the generation of the gas of the jointing agent can be respectively eliminated. As a result, the casting accuracy can be improved.

Inasmuch as there are separately provided the safety valve for relieving the anomalous oil under pressure into the tank to protect the circuit and the actuators when the anomalous oil under pressure is generated in the circuit and the suction pipe for preventing the generation of the negative pressure by sucking the oil under pressure from the tank to the circuit when the negative pressure is generated in the circuit, the hydraulic control valve according to the present invention becomes compact in structure thereof and is manufactured with ease at a low cost compared with the conventional hydraulic control valve having the safety valve integrated with the suction valve.

Since the safety valve and the suction valve are separately provided and the suction valve is incorporated into the valve body, the safety valve can be made compact in size which results in the miniaturization of the valve body of the hydraulic control valve.

It is claimed:

1. A control valve for use with fluid pressure operated devices, comprising: an elongated valve body having external surfaces and having a cylindrical bore extending lengthwise therethrough, a pump port communicating with said bore at the longitudinal middle thereof; first and second central drain ports communicating with said bore and being located on opposite longitudinal sides of said pump port; first and second bridge ports communicating with said bore and being located on opposite longitudinal sides of said first and second central drain ports, respectively, the laterally outer ends of said first and second bridge ports being connected to each other so that said first and second bridge ports form a substantially U-shaped passage; first and second load ports communicating with said bore and being located on opposite longitudinal sides of said first and second bridge ports, respectively, said first and second load ports being adapted to be connected to a load device; first and second longitudinally outer drain ports communicating with said bore and being located on opposite longitudinal sides of said first and second load ports, respectively; a valve spool disposed within said bore for longitudinal sliding movement between a central position and first and second terminal positions on opposite sides of said central position, said valve spool having a first land in the longitudinal center thereof which communicates said pump port with said first and second central drain ports in said central position, which blocks communication between said pump port and said second central drain port in said first terminal position of said valve spool and which blocks communication between said pump port and said first central drain port in said second terminal position, second and third lands disposed on opposite longitudinal sides of said first land for blocking communication of said first bridge port with said first load port and blocking communication of said second bridge port with said second load port in said central position of said valve spool, for communicating said first bridge port with said first load port in said first terminal position of said valve spool and for communicating said second bridge port with said second load port in said second terminal position of said valve spool, fourth and fifth lands disposed on opposite longitudinal sides of said second and third lands, respectively, for blocking communication of said first load port with said first outer drain port and for blocking communication of said second load port with said second outer drain port in said central position of said valve spool, for communicating said second load port with said second outer drain port in said first terminal position of said valve spool and for communicating said first load port with said first outer drain port in said second terminal position of said valve spool, a parallel port adapted to be connected to receive a pump output, said parallel port extending transversely in the central portion of said valve body and communicating with the central region of said U-shaped passage, said parallel port being located laterally inside of the central region of said U-shaped passageway; a load check valve disposed between said parallel port and the central portion of said U-shaped passage; a single automatic pressure relief valve communicated to an end region of said second load port between said second load port and said second outer drain port for permitting excessively pressurized fluid in the load device to be discharged therefrom; a single suction valve separate from said pressure relief valve and communicated to an opposite end region of said second load port between said second outer drain port and said second load port for supplying fluid to the load device when a vacuum is created therein, said pressure relief valve and said suction valve being disposed on said valve body on opposite sides of the fifth land of said spool proximate said second drain port and remote from said first drain port and communicated to said second outer drain port by a respective pressure relief passage and suction passage whereby said pressure relief valve and said suction valve both communicate to said second outer drain port, said suction valve being communicated to said opposite end region of said second load port by a second suction passage oriented at an acute angle relative to said suction passage and passage means for communicating said first outer drain port to said second outer drain port such that said excessively pressurized fluid or said vacuum can be accommodated by said single pressure relief valve or said single suction valve regardless of the terminal position of said spool and regardless of said single pressure relief valve and said single suction valve being disposed remote from said first drain port.

* * * * *